May 2, 1967
O. C. NIEDERER ETAL
3,316,688
PACKING EQUIPMENT
Filed Jan. 16, 1964
3 Sheets-Sheet 1
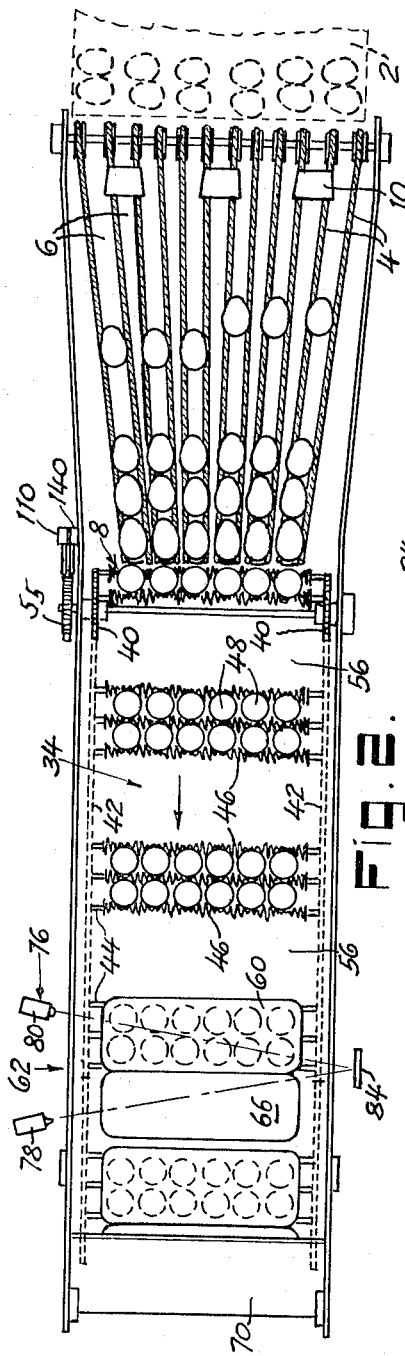
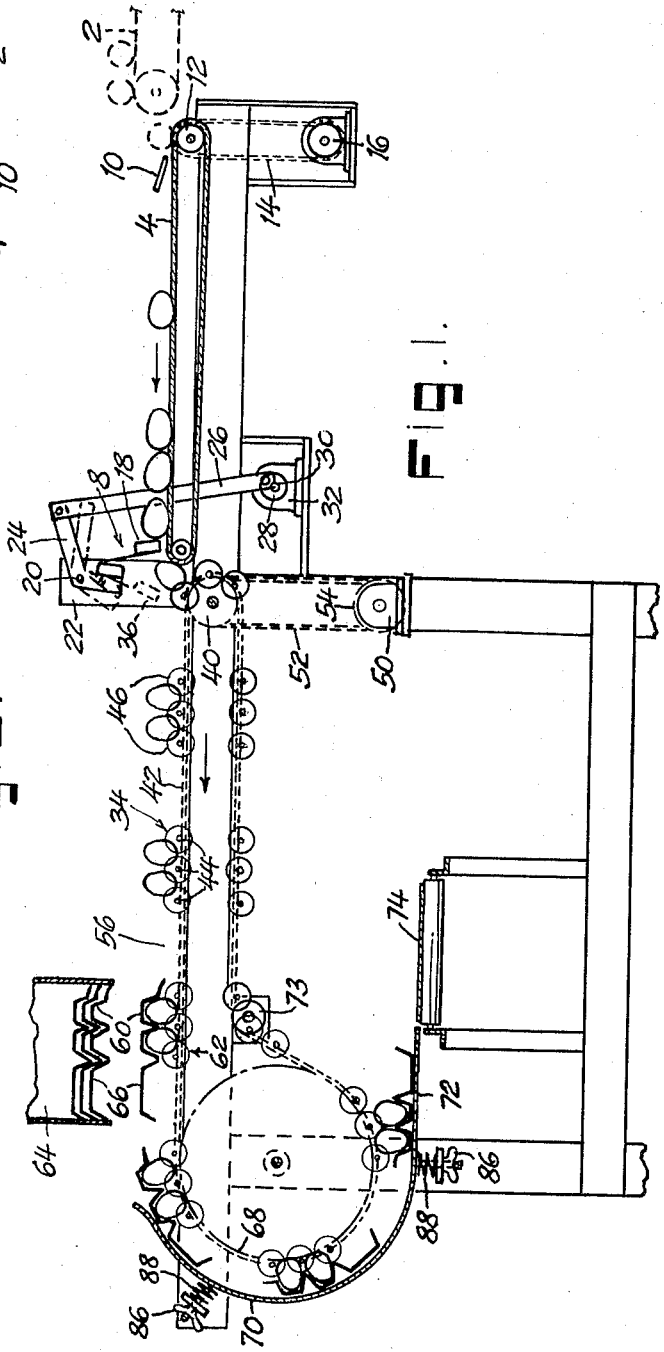
INVENTORS
OTTO C. NIEDERER
BY HERBERT O. NIEDERER
Albert Sperry
ATTORNEY May 2, 1967 O. C. NIEDERER ETAL 3,316,688
PACKING EQUIPMENT Filed Jan. 16, 1964 3 Sheets-Sheet 2

INVENTORS
OTTO C. NIEDERER
BY HERBERT O. NIEDERER
Albert Sperry
ATTORNEY

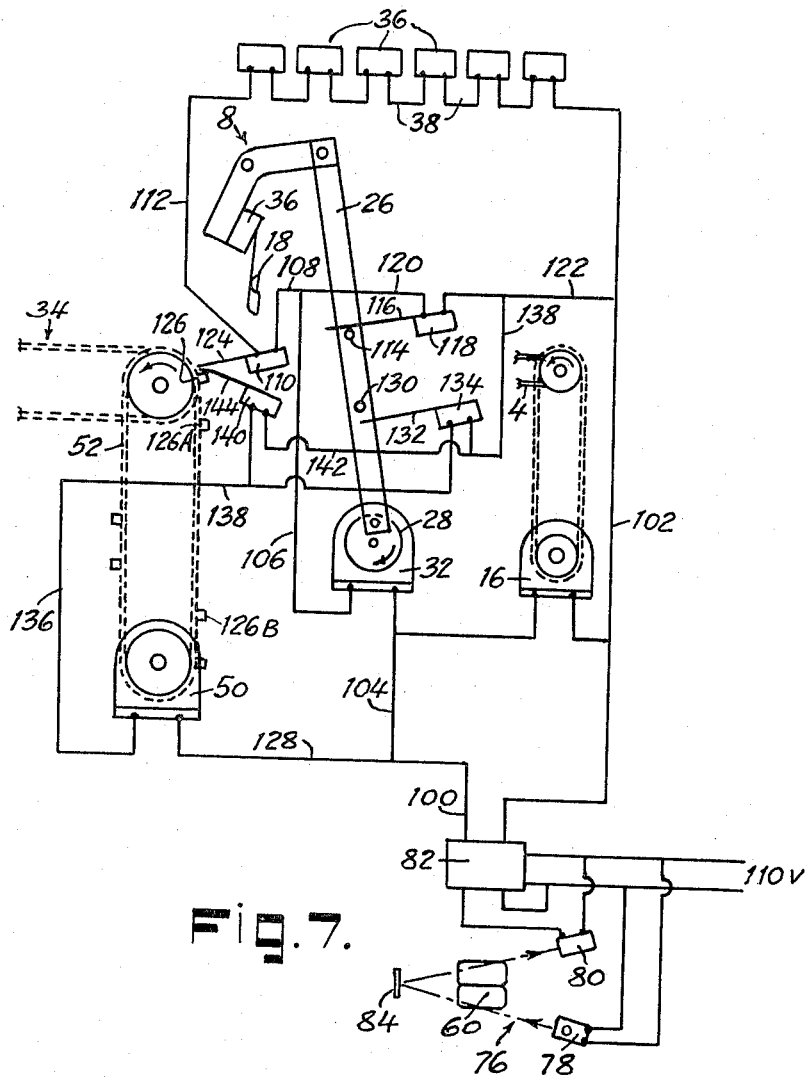

United States Patent Office 3,316,688
Patented May 2, 1967

3,316,688
PACKING EQUIPMENT
Otto C. Niederer, Bear Tavern Road, and Herbert O. Niederer, Church Road, both of Titusville, N.J. 08560
Filed Jan. 16, 1964, Ser. No. 338,192
9 Claims. (Cl. 53—62)

This invention relates to equipment for packing eggs or other articles in cartons or cavities in receptacles, and is directed particularly to mechanism which can be operated at relatively high speed without damaging the eggs or articles being handled.

Several types of egg-packing equipment have been suggested heretofore, but they are, in general, quite expensive and complicated in construction and do not operate at the high speeds required in modern egg-handling operations.

In accordance with the present invention, these objections and limitations of the prior art are overcome and improved equipment adapted for use in packing eggs or the like are provided. These advantages are preferably attained by assembling eggs or other articles to be packed together with the cartons or receptacles on a conveyor with the cartons or receptacles placed on top of the eggs or articles, after which the assembled eggs and cartons are inverted while remaining in substantially the same relative positions with respect to each other. In this way, the eggs or articles can be packed very rapidly without danger in breaking or damaging the eggs during the packing operation.

Accordingly, the principal objects of the present invention are to increase the speed and reduce the damage to which eggs or the like are subjected in the packing thereof in cartons or receptacles and to provide novel methods for handling eggs and cartons or receptacles in the assembling and packing thereof.

A specific object of the present invention is to provide equipment wherein the eggs or articles to be packed are supported on a conveyor, the carton or receptacle is placed over the eggs in an inverted position while the eggs are supported on the conveyor, and the assembled eggs and carton are inverted while thus assembled so that the eggs and carton are not relatively displaced to any substantial extent in depositing the eggs in or on the receptacle in a position to be supported thereby.

These and other objects and features of the present invention will appear from the following description thereof wherein reference is made to the figures of the accompanying drawings.

In the drawings:

FIG. 1 is a diagrammatic side elevation of a typical form of packing equipment embodying the present invention;

FIG. 2 is a top plan view of the equipment illustrated in FIG. 1;

FIG. 7 is a diagrammatic wiring diagram which may be used in controlling equipment embodying the present invention.

Figure 3:
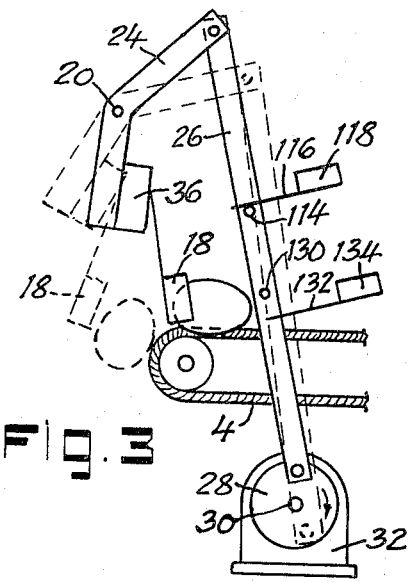
FIG. 3 is an enlarged view showing typical mechanism which may be employed in actuating an egg control device embodied in the equipment illustrated in FIG. 1.
Figure 4:
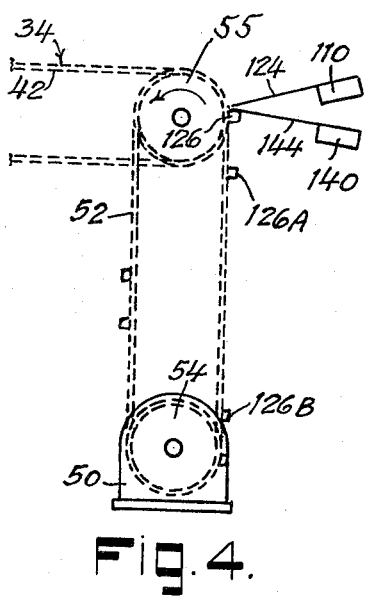
FIG. 4 is an enlarged view illustrating typical driving means for the packing conveyor embodied in the equipment of FIG. 1.

In that form of the invention chosen for purposes of illustration, the eggs or articles to be packed are supplied from any suitable source indicated generally at 2 which may be an egg grader, an egg candler, an egg cleaner, a conveyor or any other form of equipment designed to feed the eggs or articles to the egg-packing equipment. The eggs thus supplied are received by a plurality of parallel egg-moving belts 4 which are arranged in pairs and substantially parallel so as to form a plurality of egg-conducting channels 6. The belts 4 are preferably formed of coiled spring material or the like to present a cushioned support for the eggs as they are moved from the egg-supply means 2 to a feed-controlling device 8. The belts 4 can be made of any suitable material such as plastic, metal or the like, but it is found in practice that belts formed of highly polished or smooth turns of wire of uniform diameter are most desirable since the eggs then can slip or move readily on the belts 4 so as to assume positions wherein the long axes of the eggs extend parallel to the belts. Furthermore, it is often desirable to position an egg-engaging or turning means, such as the inclined strip 10, adjacent the channels 6 so that when necessary the eggs will be turned or rotated at right angles to the long axes thereof to cause the larger ends of all of the eggs to face in the same direction and preferably are arranged so that the larger ends are directed forwardly as the eggs are advanced toward the feed-controlling device 8.

The belts 4 or other egg-moving means employed are preferably driven continuously by a sprocket 12, chain 14 and the motor 16 to advance the eggs into positions wherein they engage egg-retarding members 18 of the egg-controlling device 8. The egg-retarding members are mounted on a rod 20 supported on standards 22 at opposite sides of the belts 4. As shown, there may be six egg-conducting channels and six equally spaced egg-retarding members 18 each of which is aligned with one of the egg-conducting channels 6. An arm 24 is secured to the rod 20 and is connected by a link 26 to a crank arm 28 mounted on a shaft 30 and rotatable by motor 32.

The egg-retarding members 18 are designed to be moved and controlled so that they will serve to cause a set or group of eggs, say six eggs at a time, to be transferred from the egg-moving means 4 to a packing conveyor 34. For this purpose, a micro-switch or other sensing means 36 is associated with each egg-retarding member 18 and may be mounted on the rod 20 adjacent the egg-retarding member so as to be actuated when an egg engages the egg-retarding member. The micro-switches 36 are preferably connected in series by conductors 38 so that a circuit can be completed through all of the micro-switches when all of the egg-retarding members 18 are engaged by eggs and a full set or group of eggs is in position for transfer to the packing conveyor 34. Upon operation of the motor 32 the egg-controlling device 8 is caused to perform a cycle of operations wherein the link 26 is moved downward to rock the shaft 20 and move the egg-retarding members 18 from the full line position of FIGS. 1 and 3 to the dotted line position indicated. The group of eggs previously retained by the egg-retarding members are then free to move from the egg-moving belts 4 to the packing conveyor 34. Thereafter, the shaft 20 and retarding members 18 will be returned to the full line position completing the cycle of operation so that they will remain in position to receive and retard the movement of eggs in the channels 6 until a new cycle of operation is to be performed.

The packing conveyor 34 is arranged to pass about sprockets 40 located adjacent the feed-controlling device 8 in position to receive a set of eggs from the feed control device upon each cycle of operation. The conveyor 34 may be of the general type shown and described in co-pending application Ser. No. 170,768 and embodies parallel side chains 42 having rods 44 carried by the chains and extending transversely of the conveyor. Coiled spring members 46 surround the rods 44 and are provided with adjacent portions of relatively large and relatively small diameter arranged to present egg-holding cavities 48 in which the eggs may be supported with their long axes extending vertically. The egg packing conveyor is driven by a motor 50 through the chain 52 and sprockets 54 and 55. The operation of motor 50 and the movement of the packing conveyor 34 are controlled in timed relation with respect to the operation of the feed-control device 8 so that the packing conveyor will be advanced step by step to present a transversely extending row of the egg-holding cavities 48 to the feed-controlling device 8 in position to receive a complete set or group of eggs each time the feed-controlling device is actuated. The packing conveyor is then further advanced by rotation of the sprocket 54 so that another transversely extending row of egg-holding cavities 48 will be made available to receive the next set or group of eggs when the belts 4 have advanced eggs to engage each of the egg-retarding members associated with the egg-conducting channels 6.

Figure 5:
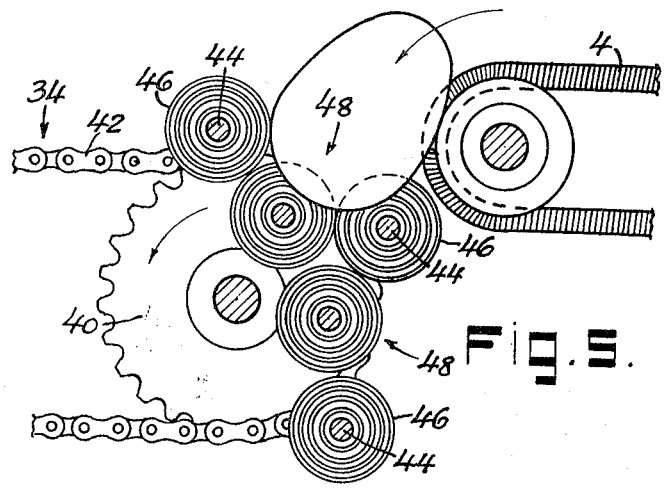
FIG. 5 is an enlarged view illustrating the manner in which eggs may be transferred to the packing conveyor of FIG. 1.

In the construction illustrated in FIGS. 1, 2 and 5 of the drawings, the packing conveyor 34 is provided with transversely extending coiled spring members 46 which are arranged in groups of three such members presenting two parallel rows of the egg-holding cavities 48. A space 56 having no coiled spring members is then left between each of the groups of three coiled springs. The movement of the packing conveyor then may be controlled in such a way as to cause two parallel sets or rows of eggs to be deposited in the egg-holding cavities on the upper surface thereof with the larger ends extending downward in the cavities whereas a space 56 will be left between each two sets of the eggs to be packed.

The cartons or receptacles 60 in which the eggs are to be packed are located at a carton applying station 62 along the upper run of the packing conveyor 34 and may be applied to the eggs by hand or by automatic means indicated generally at 64. The cartons 60 are inverted when placed on the eggs supported on the packing conveyor so that the open sides or cavities in the carton face downward and will fit over the upwardly projecting smaller ends of the eggs on the conveyor. At the same time, the cover 66 of the carton may extend into the space 56 between the groups of three coiled spring members on which the eggs to be packed are supported. The assembled eggs and cartons are thus supported on the packing conveyor 34 in inverted positions from those in which they will normally be handled. After the packing conveyor with the eggs and cartons assembled in inverted position thereon has been moved past the carton applying station 62, it passes about a relatively large drum or sprockets 68 and beneath an overhanging arcuate holding means or shield 70. The holding means is positioned so as to be substantially parallel to the conveyor as it passes about the sprocket 68 and is spaced from the conveyor a distance sufficient to prevent undesired displacement of the cartons and eggs with respect to the conveyor and with respect to each other. The continued movement of the assembled cartons and eggs about the sprockets 68 causes the cartons and eggs to be inverted to an upright position. The lower end 72 of the holding means 70 is preferably extended horizontally to serve as a shelf to which the open and upright cartons with the eggs properly positioned therein are delivered. However, the packing conveyor 34 is held in engagement with the sprockets 68 by means of the idler sprockets 73 so that the conveyor will be raised out of contact with the carton in which the eggs have been packed as the carton moves onto the shelf 72. Further, if desired, a transversely movable conveyor 74 may be positioned adjacent the shelf or the lower portion of the holding means 72 to receive the packed cartons of eggs and remove them from the packing equipment to a point where the cover 66 of the carton may be closed and sealed or the cartons otherwise handled as desired.

In order to assure proper operation of the equipment, it is, of course, necessary for a carton to be applied to each dozen eggs before the eggs pass beneath the shield or holding means 70. Therefore, a safety device is located between the carton applying station 62 and the shield 70 to stop the packing conveyor in the event the carton applying means or an operator should fail to place a carton on the eggs. For this purpose, a safety device 76 may be provided. As shown, a light 78 may be used in combination with a photo-electric cell 80 to respond to the absence of a carton for the purpose of actuating a relay 82 to break the circuit by which the packing conveyor driving motor 50 is energized when there is no carton on the eggs. In pratice, it is desirable to cause the light from the source 78 to be directed onto a reflector 84 on the opposite side of the packing conveyor and back to the electric eye 80. In this way, the desired spacing of the cartons and eggs on the conveyor can be maintained and the safety device will only be actuated when excessive spacing of the cartons due to the omission of a carton occurs.

The construction thus provided renders it possible to package eggs at high speed and with a minimum of manipulation or movement so that little or no breakage or damage to the eggs or articles being packed will occur. Moreover, the eggs can be supplied to the packaging equipment from other conventional or preferred types of egg-handling means whereby the packing of the eggs can be integrated into a continuously operating system by which the eggs are cleaned, candled, graded or otherwise treated and handled.

It will also be noted that the relatively smooth egg-delivering belts 4 which form the channels 6 serve to allow slippage of the eggs relative thereto whereby two, three or several eggs may accumulate in one channel even though other channels are empty, and yet the feed-controlling means will not be actuated until an egg is presented in each channel so as to assure the completion of each set or group of eggs before they are transferred to the packing conveyor for packing. Therefore, no partially filled cartons will be packed. The excess eggs in any channel 6 can be transferred to another channel by hand if desired. However, when any channel is filled, the eggs generally will shift laterally from one channel to another at the ends of the channels to engage the retarding members 18 of other channels so as to assure the filling of all channels and undelayed operation of the equipment.

It will also be apparent that when the cartons or receptacles to be filled do not have attached covers, the spaces 56 between the groups of three coiled spring members can be omitted and the eggs preesnted in adjacent rows for reception of the cartons. In a similar way, when packing eggs in crates, the spaces 56 can be omitted or spaced a greater distance apart whereby cartons having separate covers or large flexible filler flats can be used and inverted over continuously arranged or numerous rows of eggs supported on the packing conveyor. The filler flats and eggs will then pass about the large sprockets 68 and beneath the holder 70 so that the filled flats will be delivered to the shelf 72 and/or the conveyor 74 for placement in the egg crate or other holder therefor.

The holding means 70 illustrated is in the form of a sheet of metal or the like, but it may consist of a belt, rods or other elements curved or arranged to hold the assembled eggs and cartons in engagement with the packing conveyor as they pass about the large sprocket 68. Further, if desired, the holding means may be mounted for adjustment toward and away from the packing conveyor by means of wing nuts 86 or the like, and may be provided with yieldable or spring means 88 to exert limited pressure on the cartons so that the cartons and eggs will be held in place on the packing conveyor as they are inverted.

Figure 6:
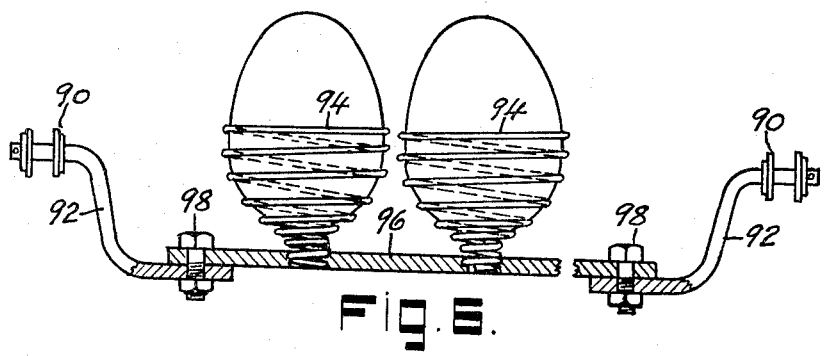
FIG. 6 is an enlarged view illustrating an alternative form of egg holding cavity which may be used on the packing conveyor of equipment embodying the present invention.

While the packing conveyor may be of the type shown in application Ser. No. 170,768, it is possible, and sometimes preferable, to provide the packing conveyor with other types of egg receiving or holding means. Thus, as shown in FIG. 6, the conveyor may have side chains 90 with centrally depressed straps 92 carried by the chains and provided with upwardly facing egg receiving cups 94. Such cups can be formed of rubber, plastic, metal or any other suitable material but preferably consist of yieldable means such as coiled spring constructions which are mounted in properly spaced relation on a bar 96 adapted to be attached to the straps 92 by bolts 98 or the like. The use of packing conveyors having cups or the like thus arranged renders it possible to pack eggs in "pillar type" cartons or the like wherein projections on the carton may extend downward between the rows of egg-holding cups and the straps or other means on which the cups are mounted.

The electrical circuits or other means employed for timing and controlling the movements and operation of the various elements of the equipment can be constructed and arranged in any suitable or preferred manner. However, for purposes of illustration, a typical control system is shown diagrammatically in FIG. 7. Thus, the egg-moving belts 4 are designed to be driven continuously by means of the motor 16 using current supplied from a suitable source through line 100 and return line 102. However, the return line is controlled by safety device 76 through relay 82 in response to operation of the photoelectric cell 80 to interrupt the operation of the equipment in the absence of a carton on the packing conveyor 34. For initial operation of the equipment, empty cartons can be placed on the packing conveyor or light 78 can be shielded in any manner until filled cartons reach the safety device 76 to insure continued normal operation of the equipment.

The egg-moving belts 4 serve to move eggs into engagement with the egg-retarding members 18; and when a complete set, of say six eggs, are in position for transfer to the packing conveyor, the micro-switches 36 will be closed through conductors 38 and a circuit will be completed to energize motor 32. Current will then flow from line 100 through conductor 104 to motor 32 and the circuit will be completed through lines 106 and 108 and a closed switch 110 to line 112, and the closed micro-switches 36 to return line 102. As a result, motor 32 will be energized to rotate crank arm 28 to move link 26 downward and initiate a cycle of operation of the egg control device 8. In this way, a set of eggs will be released for transfer to the egg-holding cavities of the packing conveyor. The link 26 actuated by motor 32 has a pin 114 thereon which, when link 26 is raised, engages the arm 116 of a switch 118 to hold the switch open. However, when a cycle of operation of the egg control device has been initiated and link 26 moves downward, the pin 114 will disengage the arm 116 to allow switch 118 to close. When switch 118 closes, a holding circuit is established for continuing the flow of current from motor 32 through lines 106 and 120, the now closed switch 118 and line 122 to return line 102. Accordingly, motor 32 will continue to be energized after the eggs pass the egg-retarding members 18 and the circuit through micro-switches 36 is broken. Thereafter, upon completion of a cycle of operation of the egg control device, line 26 will again move upward until pin 114 again engages the switch arm 116 whereby the switch 118 will be opened and the holding circuit for motor 32 will be broken. As a result, the motor 32 will not again be operated until a full complement of eggs engages the holding members 18 to close the micro-switches 36 and initiate a new cycle of operations.

The switch 110 through which current flows when initiating a cycle of operation of the egg control device is closed by engagement of the switch arm 124 thereof with a lug 126 carried by the chain 52 which drives the packing conveyor 34. The latter chain and the packing conveyor are driven by a motor 50 in timed relation to the operation of the egg control device 8. For this purpose, current from line 100 passes to the motor 50 through line 128. However, the motor circuit is not completed until the link 26 actuated by motor 32 of the egg control device 8 has moved downward a sufficient distance to cause pin 130 on the link 26 to engage the arm 132 of a switch 134. When this occurs, current flows from the motor 50 through line 136 and closed switch 134 and lines 138 and 122 to return line 102. The energizing of motor 50 and movement of chain 52 and packing conveyor 34 is, therefore, delayed until the egg control device 8 has moved through a sufficient portion of its cycle to permit the transfer of a set of eggs from the egg-moving belts 4 to the egg-holding cavities 48 of the packing conveyor 34.

The motor 50 is then energized to drive chain 52 and the packing conveyor. Furthermore, motor 50 also is provided with a holding circuit to assure continued operation of the motor and movement of chain 52 and the packing conveyor 34 during completion of the cycle of operation of the egg control device and after upward movement of the link 26 to allow switch 134 to open. For this purpose, a line 138 connected to motor 50 extends to a switch 140 and thence through line 142 to return line 102. The switch 140 is opened by engagement of the switch arm 144 with the lug 126 on chain 52. However, when the chain 52 is driven and upon initial operation of the motor 50, the switch arm 144 drops off the lug 126 to allow switch 140 to close. The circuit for driving the motor, chain and packing conveyor will, therefore, be maintained until another lug 126A on the chain 52 engages switch arm 144.

The lugs 126 and 126A may be spaced apart or adjusted in position on the chain 52 to cause the packing conveyor to be moved step by step or various distances as required for packing eggs in any desired type of carton. When the cartons being packed are designed to receive one dozen eggs arranged in two rows of six eggs each as shown at 60 in FIG. 1 and have an attached cover 66, the egg-receiving cavities 48 in the packing conveyor will be arranged as shown in FIG. 2 to present two parallel rows of such cavities with a space 56 therebetween to accommodate the cover. The control lugs on chain 52 are then arranged so that lugs 126 and 126A will cause the packing conveyor to be advanced a relatively short step to move each of the two adjacent rows of egg-holding cavities into the proper position adjacent the egg control device 8. On the other hand, the next lug 126B on the chain 52 is spaced a sufficient distance from lug 126A to cause the packing conveyor 34 to move far enough to leave the space 56 between the egg-holding cavities and then bring the first row of the next pair of cavities into position adjacent the egg control device.

If the eggs are to be packed in adjacent cartons having no cover and therefore no space 56 is provided on the packing conveyor or if the eggs are to be assembled with large filler flats for use in egg crates or otherwise arranged on the packing conveyor, the lugs 126, 126A, 126B, etc. can be suitably arranged or spaced to assure any desired or necessary movement of the packing conveyor 34. Thus, the equipment can be adapted for use in packing eggs or other articles in substantially any arrangement or type of holder desired.

Accordingly, various different types and arrangements of the driving and control means may be employed for moving and actuating the egg-feeding belts, the feed control device, the packing conveyor and other elements or parts of the equipment. Either electrical, mechanical or any other preferred type of control means may be used, and other forms, types and arrangements of the various elements of the combination may be employed to assure proper timing and operation of the equipment and proper supply, support and handling of the eggs and cartons in packing eggs. Furthermore, the equipment is not limited in its use to the packing of eggs but may be employed in handling fruit and other articles as desired.

In view thereof, it should be understood that the particular embodiments of the present invention shown in the drawings and described above are intended to be illustrative only and are not intended to limit the scope of the invention.

We claim:

1. Equipment for packing articles in a carton or the like which has parallel rows of article receiving cavities therein, said equipment comprising a packing conveyor presenting parallel rows of article holding cavities corresponding in arrangement ot those of the cavities in the carton in which the articles are to be packed, article moving means arranged to cause articles to move toward the packing conveyor, a control device positioned between the article moving means and packing conveyor and having a row of article retarding elements thereon similar in number and spacing to the article holding cavities in the packing conveyor, said retarding elements being positioned to be engaged by articles on the article moving the packing conveyor from the control device the article moving means to the packing conveyor, means for actuating the control device to displace said retarding elements and permit transfer of a row of articles from the article moving means to article holding cavities in the packing conveyor, a packing station located adjacent the packing conveyor for the placement of a carton on articles located in the article holding cavities in the packing conveyor, a drum having a horizontal axis, means for moving the packing conveyor from the control device past the packing station and about said drum to invert the articles and a carton placed thereon, and means spaced from the drum and positioned to hold the articles and a carton placed thereon in substantially fixed relative poistions during movement thereof with the packing conveyor about the drum.

2. Equipment for packaging eggs comprising a packing conveyor having a plurality of parallel rows of egg holding cavities thereon extending transversely of the conveyor with the number of cavities in each of said rows being the same, egg moving means for directing eggs to the packing conveyor and including a number of channels equal to the number of cavities in each transverse row of cavities on the packing conveyor, an egg control device located between the egg moving means and the packing conveyor and including an egg retarding member positioned in alignment with each of said channels, sensing means associated with each egg retarding member and responsive to the presence of an egg in engagement with the egg retarding member, means controlled by said sensing means and connected to the egg control device for moving said egg retarding members to permit a row of eggs to be transferred from the channels of the egg moving means to a row of cavities in the packing conveyor, and means for advancing the packing conveyor to present another row of cavities to the egg moving means after the deposit of a row of eggs in one of said rows of cavities on the packing conveyor.

3. Equipment for packing eggs comprising a packing conveyor having a plurality of parallel rows of egg holding cavities thereon extending transversely of the conveyor with the number of cavities in each of said rows being the same, egg moving means for directing eggs to the packing conveyor and including a number of channels equal to the number of cavities in each transverse row of cavities on the packing conveyor, an egg control device located between the egg moving means and the packing conveyor and including an egg retarding member positioned in alignment with each of said channels, sensing means associated with each egg retarding member and responsive to the presence of an egg in engagement with the egg retarding member, means for initiating a cycle of operation of said egg retarding device when all of said sensing means have thus been rendered responsive, said egg control means being movable during such cycle of operation to permit a row of eggs to pass from the egg moving means into a row of cavities in the packing conveyor, and means for advancing said conveyor after the deposit of a row of eggs in one of said rows of cavities to present an adjacent row of cavities in the packing conveyor to the egg moving means.

4. Egg packing equipment as defined in claim 3 wherein said packing conveyor is movable from the egg moving means to a carton applying station, and the conveyor, eggs and a carton applied to the eggs are then moved on to holding means, and means for inverting the conveyor, eggs and carton while they are held in substantially fixed relative positions by said holding means.

5. Egg packing equipment as defined in claim 3 wherein the packing conveyor with the eggs carried thereby is moved past a carton applying station and over and about a drum, and means for holding eggs and a carton applied thereto in substantially fixed relative positions during movement of the packing conveyor about the drum.

6. Egg packing equipment as defined in claim 5 wherein means are provided for receiving the assembled eggs and cartons when they reach the lower portion of the drum.

7. Egg packing equipment as defined in claim 5 wherein a conveyor is located adjacent the lower portion of the drum in position to receive assembled eggs and cartons from the packing conveyor and drum.

8. Egg packing equipment as defined in claim 5 wherein a safety device is located adjacent the packing conveyor and between said carton applying station and drum, said safety device being responsive to the absence of a carton applied to said eggs and operable to interrupt the movement of the packing conveyor.

9. Egg packing equipment comprising a packing conveyor having a plurality of parallel rows of egg holding cavities arranged in spoced relation longitudinally of the conveyor and extending transversely of the conveyor, control means for depositing groups of eggs in said transversely extending rows of cavities, driving means for moving said packing conveyor from said control means past a carton applying station while holding the eggs in position to have a carton placed in an inverted position over the groups of eggs, said driving means and control means having mechanism connected thereto for coordinating the movement thereof to insure the deposit of groups of eggs in said transversely extending rows of cavities and to prevent the deposit of eggs in the spaces on the packing conveyor between said rows of cavities, means located beyond the carton applying station for inverting the eggs and a carton applied thereto, and means for holding said groups of eggs and a carton applied thereto in substantially fixed relative positions with respect to the packing conveyor while inverting the same.

References Cited by the Examiner

UNITED STATES PATENTS

| 2,763,110 | 9/1956 | Stuart | 53—392 X |
| 3,169,354 | 2/1965 | Bliss et al. | 53—61 |
| 3,193,082 | 7/1965 | Crane | 53—392 X |

TRAVIS C. McGEHEE, *Primary Examiner.*

UNITED STATES PATENT OFFICE
CERTIFICATE OF CORRECTION

Patent No. 3,316,688                      May 2, 1967

Otto C. Niederer et al.

It is hereby certified that error appears in the above numbered patent requiring correction and that the said Letters Patent should read as corrected below.

Column 7, line 20, strike out "the packing conveyor from the control device" and insert instead -- means so as to prevent transfer of articles from --; line 34, for "poistions" read -- positions --; same column 7, line 36, for "packaging" read -- packing --; column 8, line 43, for "spoced" read -- spaced --.

Signed and sealed this 21st day of November 1967.

(SEAL)
Attest:

Edward M. Fletcher, Jr.

Attesting Officer

EDWARD J. BRENNER

Commissioner of Patents